United States Patent [19]

Pratt

[11] 3,798,552

[45] Mar. 19, 1974

[54] AUTOMATIC FREQUENCY CONTROL FOR PULSE RADAR AND COMMUNICATION SYSTEMS

[75] Inventor: John Harry Pratt, Los Angeles, Calif.

[73] Assignee: RCA Corporation, New York, N.Y.

[22] Filed: Dec. 7, 1972

[21] Appl. No.: 312,900

[52] U.S. Cl. .................. 325/420, 325/423, 325/335

[51] Int. Cl. .............................................. H04b 1/16

[58] Field of Search ............ 325/17, 332, 333, 335, 325/344–347, 349, 444, 419–423, 433, 436, 437, 418; 343/7 A; 329/122, 136

[56] References Cited

UNITED STATES PATENTS 3,150,322 9/1964 Saun .................................. 325/423

*Primary Examiner*—Albert J. Mayer

*Attorney, Agent, or Firm*—Edward J. Norton; Joseph D. Lazar

[57] ABSTRACT

An automatic frequency control (AFC) system particularly suitable for pulse radar and communication systems with improved performance in that (*a*) negligible change in frequency occurs between pulses, assuring that the received signal remains centered in the receiver pass band during the entire receive period, (*b*) the center of the main lobe of the transmitter spectrum is used as the reference by gating out the rising and falling portions of the transmitter pulse where the frequency may be changing, and (*c*) the system cannot lock near the "image" frequency where the local oscillator is on the wrong side of the transmitter frequency and the receiver is mistuned.

10 Claims, 3 Drawing Figures

FREQUENCY DIAGRAMS

AUTOMATIC FREQUENCY CONTROL FOR PULSE RADAR AND COMMUNICATION SYSTEMS

BACKGROUND OF THE INVENTION

1. Field of the Invention

This invention relates to automatic frequency control systems. It is particularly concerned with apparatus for automatically maintaining the frequency of a high frequency continuous wave local oscillator at a predetermined and constant frequency difference from a carrier frequency.

2. Description of Prior Art

Automatic frequency control systems are well known in communication and radar systems. Generally, a conventional AFC system comprises a mixer, intermediate frequency amplifier, limiter, discriminator, and a sawtooth sweep generator controlling the frequency of a local oscillator. Samples of the local oscillator output and the transmitter output are applied to the mixer and the difference frequency is amplified in the intermediate frequency amplifier and applied to the discriminator. The discriminator provides an output of one polarity when the frequency is below its center frequency and the other polarity when it is above its center frequency. A typical discriminator characteristic to be used in describing one embodiment of the present invention is shown in FIG. 2*a*. The conventional AFC system is arranged so that as the signal sweeps through the discriminator center frequency the increasing output opposes the sweep voltage and drives the frequency in the opposite direction during each pulse. Between pulses the sweep continues. Thus, the intermediate frequency oscillates or hunts constantly around the desired frequency. This is undesirable because the receiver pass band must be made wider than the value necessary to pass the transmitter spectrum to allow for this oscillation or drift during the receive period.

Another difficulty with convention AFC systems is illustrated by further reference to FIG. 2a. The desired local oscillator frequency may be either above or below the transmitter frequency by the intermediate frequency at $f_t - f_i$ or $f_t + f_i$, where $f_t$ is the transmitted frequency and $f_i$ is the difference between the image frequency and the transmitted frequency. Assume that the proper local oscillator frequency is $f_t - f_i$ as at 112 of FIG. 2*a*. When the local oscillator frequency is in the vicinity of 112 the polarity of the discriminator output is such as to drive the local oscillator frequency toward 112. However, if the oscillator happens to start at a frequency outside the discriminator bandpass, as for example, above frequency 114, and the sweep direction is upward, the frequency of the LO will increase until it enters the low side of the image discriminator characteristic at frequency 116. The polarity of the discriminator output in this region is such as to oppose the sweep and the LO hunts around a "resting frequency" $f_r$ at 110. This LO frequency produces an incorrect intermediate frequency $f_r - f_t$ instead of the correct intermediate frequency $f_t + f_i - f_t = f_i$ and results in a failure of the system. To avoid this problem it is usual to limit the maximum excursion of the local oscillator so that it never reaches the resting frequency $f_r$. This is difficult to do in a reliable manner when all environmental and aging conditions are considered.

Still another difficulty with conventional AFC systems as used in radar arises from the tendency of most radar transmitter oscillators to change frequency during the rising and falling portions of the modulator pulse. This makes the AFC system pull the local oscillator frequency in one direction during the rising portion of the pulse and in the opposite direction as the flat portion of the pulse is reached, with a repetition of this transient as the pulse amplitude decreases. The local oscillator frequency reached at the end of the pulse depends upon the relative amplitudes of these transients. The amplitudes of the transients are usually sensitive to changes in the amplitude of the intermediate frequency signal because of amplitude-to-phase modulation effects in the limiter which are difficult to avoid. This causes the intermediate frequency to change when the amplitude of the local oscillator or the transmitter signal changes. One known circuit (U.S. Pat. No. 3,021,424 issued to W. E. Morgan, Jr. on Feb. 13, 1962, for an "Automatic Frequency Control System") utilizes the sum and difference outputs from a discriminator to prevent the system from locking with the local oscillator frequency at $f_r$. This circuit has the disadvantage of "hunting" around the desired frequency as described above in common with other conventional pulse AFC systems. Furthermore it does not avoid the third difficulty described arising from frequency modulation of the transmitter pulse.

SUMMARY OF THE INVENTION

The present invention comprises a mixer for generating the difference between a voltage-controlled local oscillator and a pulsed carrier-frequency signal, a discriminator, and a gated integrator operating in a feedback loop to hold the difference frequency at the crossover frequency of the discriminator where the positive and negative pulses from the discriminator are of equal amplitude. An auxiliary channel sensing the sum of the magnitudes of the pulses from the discriminator is used to indicate when the difference frequency is outside of the pull-in range of the discriminator. When this condition exists system trigger pulses, applied to the integrator, sweep the local oscillator through a range great enough to include the correct frequency, and reset pulses periodically discharge the integrator and set the local oscillator at the lower limit of its range.

DETAILED DESCRIPTION OF A PREFERRED EMBODIMENT

Figure 1:
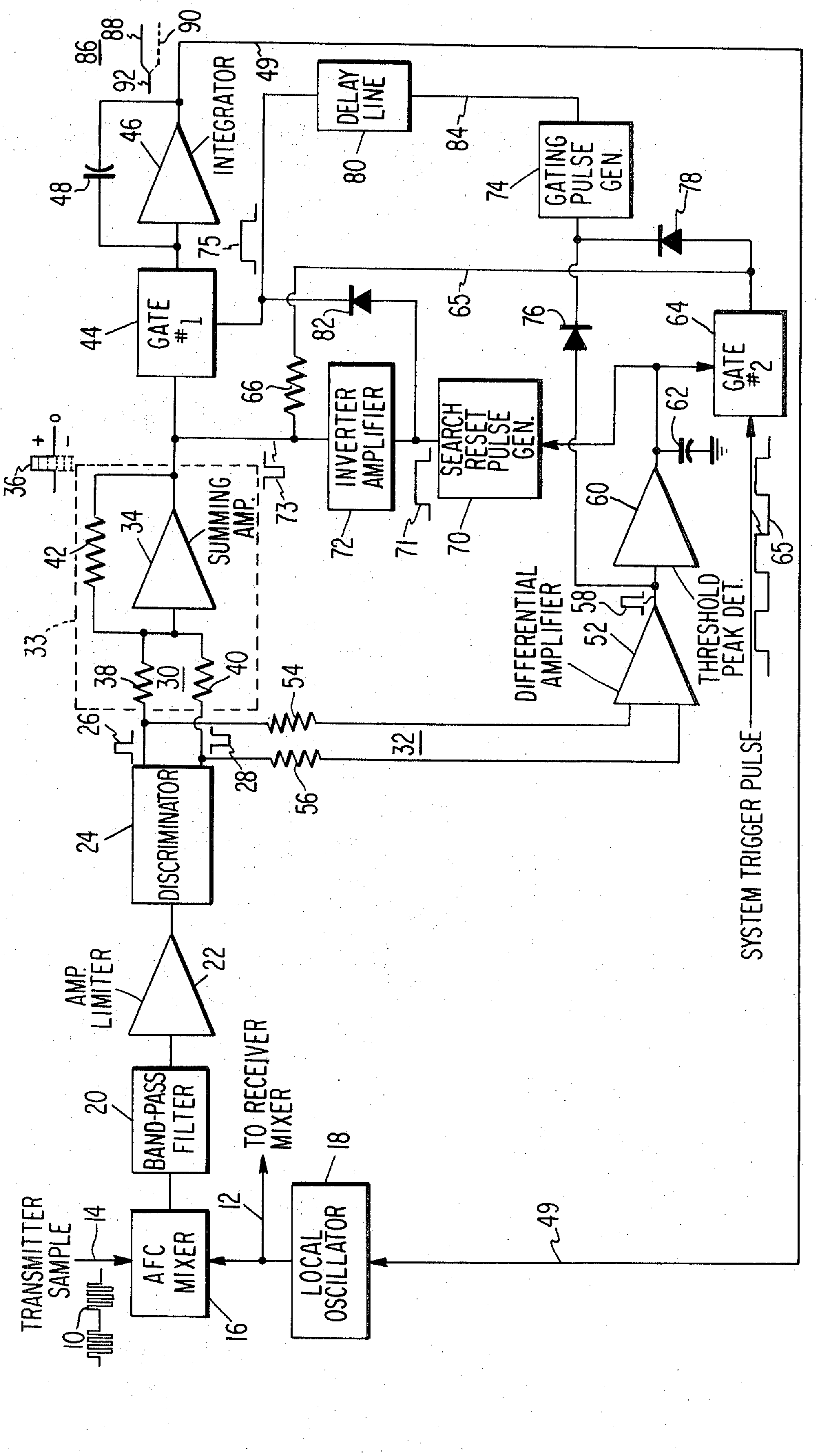
FIG. 1 is a block diagram of an automatic frequency control system embodying the present invention.

Referring to FIG. 1, an automatic frequency control (AFC) mixer 16 receives recurrent pulses of radiofrequency (RF) energy over path 14 from a transmitter, not shown, of conventional form and well known in the art as used, for example, in radar. Mixer 16 also receives continuous wave (CW) RF energy from local oscillator (LO) 18, suitably a component of the radar system. The frequency of the LO 18 is determined by the voltage appearing on control line 49. A second output from the LO is applied, via path 12, to the radar receiver mixer not shown. The intermediate frequency (IF) signal from the mixer at the difference ($f_i$) between the transmitter frequency ($f_t$) and the LO frequency ($f_o$), is applied to band pass filter LO arranged to pass all significant sidebands of the pulsed transmitter signal but prevent passage of harmonics of the IF signal which may be produced by the mixer. The signals passed through band pass filter 20 are amplified and limited by a suitable amplifier-limiter 22 and applied to a discriminator 24. Discriminator 24, which may be any of several well-known types such as Foster-Seeley or Travis, develops positive pulses 26 at one output terminal and negative pulses 28 at another output terminal. When the IF is at the center frequency of the discriminator, pulses 26 and 28 are of equal amplitude. When the IF is off-center, the output pulses of one polarity are of greater amplitude than those of the other polarity, depending upon whether the frequency deviation from the center frequency is above or below, as well known in the art.

The output pulses 26 and 28 of discriminator 24 are connected to two separate channels 30 and 32. In the upper channel 30, pulses 26 and 28 are applied to two inputs of a conventional summing amplifier 33 comprising two equal resistors 38 and 40, feedback resistor 42, and amplifier 34. Summing amplifier 33 sums or adds the voltages applied to resistors 38 and 40, as known in the art, producing a range of output pulses amplitudes represented by waveform 36. Since the summing amplifier adds the pulse amplitudes, and the input pulses 26 and 28 are of opposite polarity, the output pulses 36 are of zero amplitude for center-frequency signals, positive for frequencies off center in one direction, and negative for frequencies off center in the opposite direction. These pulses pass through a gate or switch 44 to a suitable integrator formed of amplifier 46 and capacitor 48. Switch 44 is arranged to be closed only during the center portion of the transmitter pulse which is usually substantially flat so that the summing amplifier output pulses (the error signal) are integrated during this time. Between pulses the input of integrator 46 is maintained as an open circuit by gate 44. This causes the integrator output (86) to remain constant between pulses except for any drift in integrator 46 itself as illustrated by waveform 86. As is well known in the art, integrators may be designed to show extremely small drift over periods many times those of the pulse repetition periods utilized in radar. In waveform 86 the flat portion 92 represents the integrator output before the error pulse arrives. During the pulse the integrator output rises or falls at a rate depending upon the amplitude of the pulse and the integration constant, coming to rest at a new value represented by 88 or 90 depending upon the direction of the error. If the IF is at the center frequency of the discriminator there is no error pulse and the integrator output does not change during the transmitter pulse. The integrator output is applied as a frequency-control voltage to local oscillator 18, the polarity being such that it acts to reduce the frequency error. Because any residual error is integrated from pulse to pulse the system brings the error finally to zero.

In the lower channel 32, the output pulses 26 and 28 from the discriminator 24 are applied to a conventional differential amplifier 52. Such amplifiers, as known in the art, provide an output whose amplitude is proportional to the difference of the input signals. Accordingly, since the polarity of pulses 28 and 29 are opposite in sign, the output, represented by waveform 58, consists of pulses of one polarity (positive in this case) as long as the IF is within the pass band of both filter 20 and discriminator 24 whether the IF is above or below the discriminator center frequency. The pulses from the differential amplifier are applied to a peak-detecting circuit 60 which provides an essentially constant positive dc output when the input is below an established reference level and an essentially constant negative dc output when the input pulses exceed the reference level. Such peak-detecting circuits are well known in the art and usually include a capacitor which is charged rapidly when a pulse exceeds the threshold, and which discharges slowly between pulses. This storage capacitor is represented by 62 in FIG. 1.

The output of the threshold between detector 60 controls two circuits: a gate or switch 64, and a relaxation pulse generator 70. Radar system trigger pulses 65 of standardized amplitude and width are supplied to the input of gate 64. If the output of threshold detector 60 is positive, which occurs when the IF is not within the pull-in range of the frequency control loop, gate 64 is open and the trigger pulses pass through isolating resistor 66 and gate 44 to integrator 46. Each pulse increases the control voltage on path 49 to local oscillator 18 by a small amount, causing the frequency of the local oscillator to increase the steps less than the pull-in range of the discriminator. This represents the search mode of operation of the AFC system.

Pulses 58 from differential amplifier 52 are also applied, through isolating diode 76, to gating pulse generator 74, which is suitably a monostable multivibrator, of any type known in the art, which produces a pulse of a length equal to the flat center portion of the transmitter pulse. The output pulse from generator 74 may be applied over path 84 to a delay line 80 whose output pulse 75 is applied to control gate 44 to open it thus only during the flat portion of the transmitter pulse. If the natural components and circuit delay in triggering the gating pulse generator 74 is sufficient, it may not be necessary to include delay line 80. In the AFC search mode, when no pulses are produced by differential amplifier 52, the trigger pulses 65 passing through gate 64 are applied, via isolating diode 78, to trigger gating pulse generator 74. This results in gate 44 being open to pass a portion of each trigger pulse to integrator 46.

Figures 2A, 2B:
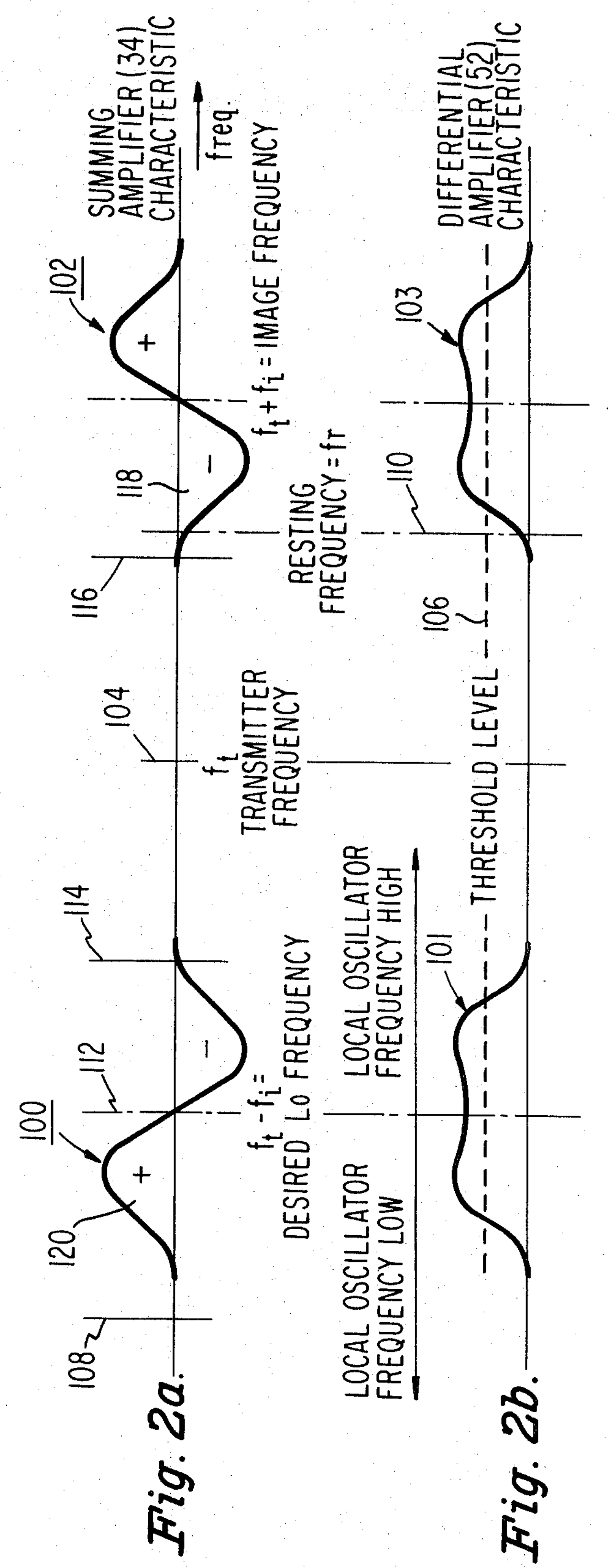
FIG. 2*a* is a plot of the discriminator characteristics in typical form showing the relative amplitudes of the pulses appearing in the "sum" channel of the system as the local oscillator frequency varies from the frequency below the transmitter frequency less the intermediate frequency to a frequency above the transmitter frequency plus the intermediate frequency.
FIG. 2*b* is a plot of the relative amplitudes of the pulses appearing in the "difference" channel as the local oscillator frequency varies over the same range, showing amplitude of a threshold level relative to the pulse amplitude.

Referring now to FIG. 2, there is shown, in FIG. 2*a*, the relationship between the amplitude of the sum-channel pulses and the local oscillator frequency, and in FIG. 2*b*, the relationship between the amplitude of the difference-channel pulses and the local oscillator frequency, as the local oscillator frequency varies from a frequency 108 below the transmitter frequency to a frequency above the transmitter frequency. The desired local oscillator (LO) frequency 112 is (in this case) $f_t - f_i$, where $f_t$ is the transmitter frequency and $f_i$ is the intermediate frequency. For frequencies that fall within the discriminator pass band near the desired, predetermined LO frequency 112 the polarity of the error signal is such as to drive the local oscillator frequency toward the desired frequency 112. Thus positive ("+") signals drive the LO higher in frequency and negative ("−") signal drive it lower.

If, for some reason, (for example a short-period failure of the transmitter) the local oscillator (LO) frequency enters the region above frequency 114, the absence or lack of signal in the difference channel 32 causes the search sweep to continue and the frequency rises toward frequency 116. As the frequency of the LO increases further and enters the image response of the discriminator at portion 118, the integrated negative pulses (28) from discriminator 24 oppose the integrated positive trigger pulses (26) causing the sweep, and the LO frequency to come to a stop to about the resting frequency 110.

When the LO 18 stops at resting frequency 110 there is insufficient output from the sum channel response 103 to exceed the threshold level 106. The search-reset pulse generator 70 (FIG. 1) is not inhibited under this condition and, at the end of its relaxation period, it fires, producing a large positive pulse 71. This pulse passes through isolating diode 82 and opens gate 44. The same pulse (71) is inverted by inverting amplifier 72 to form pulse 73 which, on passing through gate 44, discharges integrator 46. The output of the discharged integrator 46 is a voltage applied to LO 18 over path 49 which operates to return the local oscillator frequency to a point well below the desired frequency, e.g. at frequency 108. The integrated trigger pulses then sweep the LO frequency up until it reaches the discriminator response in frequency region 120 (FIG. 2a). The integrated positive pulses from the discriminator 24 drive the LO (18) frequency up to the center frequency 112. At the same time the peak-detected pulses from the sum channel 30, which pulses now exceed the threshold level, close gate 64 preventing any further sweep, and inhibiting the search reset pulse generator 70 so that it cannot fire. The LO frequency comes to rest at the desired frequency ($f_t - f_i$) at 112.

The relaxation period of the search-reset pulse generator 70 is made to be longer than the time required for the search sweep to move the LO frequency from its low frequency point 108 to well above the desired frequency at 112. Thus the frequency always passes through the desired frequency before it is reset. From the above it is apparent that an automatic frequency control system according to the present invention accomplishes the results described, namely; (*a*) the frequency of the local oscillator remains constant between pulses, the only limitation being drift of the integrator when no signal is applied, (*b*) the disturbing effect of the frequency changes that occur during the rising and falling parts of the transmitter pulse are avoided by gating out those portions of the pulse, and (*c*) locking at a frequency near the image with the local oscillator on the wrong side of the transmitter frequency is prevented by means of the auxiliary channel which senses this condition and resets the local oscillator to the beginning of its search range.

What is claimed is:

1. An automatic frequency control system for automatically maintaining a substantially constant intermediate frequency difference of predetermined value between the frequencies of local oscillator signal and a carrier wave signal comprising:

*a.* a discriminator for generating positive and negative polarity control pulses, responsive to the difference signal generated by said local oscillator signal mixed with said carrier signal,

*b.* means for summing said control pulses from said discriminator,

*c.* means for subtracting said control pulses from said discriminator,

*d.* means for integrating the output of said summing means,

*e.* means for controlling the frequency of said local oscillator in response to the integrated output of said summing means,

*f.* means for sweeping said local oscillator signal through a range of frequencies including said predetermined frequency in response to said subtracting means, and

*g.* means responsive to said subtracting means for periodically resetting said local oscillator to the beginning of its sweep range when it is not at the desired intermediate frequency, thereby preventing said local oscillator from locking near the image of said intermediate frequency difference of predetermined value.

2. A system according to claim 1 wherein said carrier signal comprises a series of recurrent pulses.

3. A system according to claim 2 wherein said subtracting means includes a differential amplifier responding to the output of said discriminator, a peak detector responding only to signal levels from said differential amplifier which exceeds a predetermined threshold level, said peak detector having a discharge time constant greater than the time interval between said recurrent pulses, and gate means responsive to said peak detector for inhibiting said sweep means when the frequency of said local oscillator signal is responding to said summing control means.

4. A system according to claim 2 including a gating pulse generator means responsive to the leading edge of said pulses at the output of said subtracting means to inhibit from said integrator the rising and falling portions of said pulse.

5. A system according to claim 2 wherein gating means inhibits the input of said integrator between pulses at the output of said discriminator thereby maintaining the output voltage of said integrating means constant whereby the frequency of said local oscillator is substantially constant between pulses.

6. A system according to claim 3 wherein said sweeping means includes gate means responsive to said peak detector to pass trigger pulses to said integrator to cause the frequency of said local oscillator to change in steps.

7. A system according to claim 6 wherein said trigger pulses are supplied from a source of system trigger pulses.

8. A system according to claim 1 wherein said image frequency preventing means includes means to reset periodically the frequency of said local oscillator to the beginning of its sweep range, said means comprising a relaxation oscillator, responsive to said subtracting means for discharging said integrating means.

9. An automatic frequency control system for automatically maintaining a substantially constant intermediate frequency difference of predetermined value between the frequencies of a local oscillator signal and a carrier wave signal comprising:

a. means for generating positive and negative polarity control signals responsive to the difference signal generated by said local oscillator signal mixed with said carrier signal, b. means responsive to the sum of said control signals manifesting the error of said local oscillator frequency to sweep the local oscillator frequency through a range of frequencies including said constant predetermind intermediate frequency, and c. means responsive to the difference of said control signals to set periodically the local oscillator frequency at its lowest frequency, whereby the local oscillator frequency is maintained substantially constant, while excursions of said local oscillator frequency into the image frequency range are inhibited.

10. An automatic frequency control system according to claim 9 wherein said carrier signal comprises a series of recurrent pulses, and further including means for rendering both said sum and difference responsive means insensitive to frequency transients of said recurrent pulses.

* * * * *